United States Patent [19]

Frenette et al.

[11] Patent Number: 5,062,264
[45] Date of Patent: Nov. 5, 1991

[54] HYDRAULIC CONTROL SYSTEM

[75] Inventors: Réal N. Frenette; Peter D. Lawrence, both of Vancouver, Canada

[73] Assignee: The University of British Columbia

[21] Appl. No.: 556,417

[22] Filed: Jul. 24, 1990

[51] Int. Cl.$^5$ ...................... F16D 31/00; B66C 23/00
[52] U.S. Cl. ...................... 60/427; 91/361; 91/461; 414/699
[58] Field of Search ............ 91/461, 361, 459, 363 R; 60/427; 414/699, 715

[56] References Cited

U.S. PATENT DOCUMENTS

| | | | |
|---|---|---|---|
| 4,377,043 | 3/1983 | Inui et al. | 414/699 |
| 4,773,302 | 9/1988 | Mizota et al. | 91/361 |
| 4,826,391 | 5/1989 | Lawrence | 414/699 |
| 4,844,685 | 7/1989 | Sagaser | 91/363 R |
| 5,005,466 | 4/1991 | Miyaoka | 91/461 |

FOREIGN PATENT DOCUMENTS

| | | |
|---|---|---|
| 851502 | 9/1970 | Canada . |
| 885292 | 11/1971 | Canada . |
| 1072324 | 2/1980 | Canada . |
| 1076795 | 5/1980 | Canada . |
| 1203309 | 2/1986 | Canada . |
| 0114337 | 7/1984 | Japan ................................. 414/699 |
| 0195937 | 11/1984 | Japan ................................. 414/699 |

Primary Examiner—Edward K. Look
Assistant Examiner—Hoang Nguyen
Attorney, Agent, or Firm—C. A. Rowley

[57] ABSTRACT

An articulated arm employs a controller to generate δr, δΘ and δz signals for controlling the movement of the arm in r, Θ and z directions to product movement of an end point from an initial location along a desired path toward a desired location. The actual location is determined by sensing the relationships between the arm segments and determining the actual location of the end point. The actual location is continuously compared with the desired location represented by the r, Θ and z signals and, if the difference between the actual location and desired location exceeds preselected limits, the δr, δΘ and δz are scaled down thereby redefining the desired location to ensure that the actual arm movement does not lag an unacceptable amount relative to the desired location.

18 Claims, 4 Drawing Sheets

HYDRAULIC CONTROL SYSTEM

FIELD OF THE INVENTION

The present invention relates to a hydraulic control system and more particularly the present invention relates to a coordinated hydraulic control system to maintain accurate operation by ensuring that the actual location of an end point and desired location as determined by the signals generated by the controller remain within preselected limits.

BACKGROUND OF THE PRESENT INVENTION

A variety of different hydraulic control systems have been proposed for use with articulated arm devices such as excavators and the like.

Canadian patent 851,502 issued to Witwer on Sept. 15, 1970 discloses a excavator control system with remote controlled valves for diverting flow of hydraulic fluid in the system to selectively apply speed and power assist to selected of the hydraulic actuators.

Canadian patent 885,292 issued Nov. 9, 1971 to Caywood et al employs overload sensing devices in the hydraulic circuit to automatically decrease the forces applied when the overload circuits are activated.

It has also been proposed to use attitude controls for an implement mounted on an articulated arm, see for example Canadian paten 1,072,324 issued Feb. 26, 1980 and 1,076,795 issued May 6, 1980 both to Willard. These patents relate to a excavator type implement wherein the attitude of the bucket for example is maintained constant as the arm is manipulated.

Canadian patent 1,203,309 issued Feb. 15, 1986 to Saulters et al provides a computer control system for controlling the orientation of an articulated boom wherein an input signal defines a desired position and the arms are moved until the desired position and actual position substantially coincide. This is done by continuously comparing the actual sensed position of the arm and comparing the sensed with the desired position and continuing the movement until the two are substantially the same.

In the operation of this type of equipment particularly equipment where one segment of the arm (the boom) is significantly more difficult to move than another (the stick) the signal specifying movement in a particular direction may lead the actual movement of the segment and if the lead becomes excessive the control becomes erratic.

BRIEF DESCRIPTION OF THE PRESENT INVENTION

It is an object of the present invention to provide a coordinated control system for controlling actuators for relatively moving arm segments of an articulated arm.

The r, $\Theta$ and z coordinates used in the disclosure are cylindrical coordinates with r being along any radius from the z axis and $\Theta$ being the angle of the boom at the z axis from a selected datum plane axial to the z axis. It will be apparent that these r, $\Theta$ or z coordinates could equally well be replaced by Cartesian coordinates in space by applying appropriate revisions to the algorithms. For simplicity the disclosure will only deal with cylindrical coordinates as they are the more likely to be used.

Broadly the present invention relates to a motion control system for actuators adapted to move arm segments of an articulated arm, said arm segments being interconnected by joints, comprising a control means generating $\delta r$, $\delta\Theta$ and $\delta z$ signals, for r, $\Theta$ and z directional movements of an end point at the free end of an arm segment, actuator means for displacing each said arm segment relative to one of said joints, means to measure the actual joint position of each of said joints, means to determine the desired joint position of each of said joints, means to determine the actual end point location of said end point, means to calculate a new desired end point location for said end point based on said $\delta r$, $\delta\Theta$ and $\delta z$ signals and the previous desired end point location of said end point, means to compare said determined actual end point location with said calculated new desired end point location and means to send modified r, $\Theta$ or z signals if said actual end point location differs from said desired end point location in any one of said directions by more than a preset limit to tend to reduce the discrepancy between said actual end point location and said new desired end point location, and means to generate control signals ($\alpha_{di}$) to actuate each of said actuators as required to obtain a desired movement of said end point based on said modified r, $\Theta$, and z signals, and actuate said actuator means.

Preferably said means to generate said control signal will include means for converting said new desired end point location signal to a joint position signal for each of said joints and means to compare said joint position signal for each of said joints with an actual joint position for each of said joints thereby provide a change in joint position signal for each of said joints.

Preferably said means to generate said control signal will further comprise means to compare said joint position signals for each of said joints with the immediately preceding joint position signal for each of said joints and dividing by time interval to provide a velocity signal for controlling the actuation of each of said joints.

Preferably means to calculate a new desired end point location will calculate the new desired end point location based on the immediately preceding desired joint position.

Preferably means will be provided to sense whether the desired movement is in a positive or negative direction or if no movement is required and the control means will provide a corresponding positive, negative or zero bias signal to said control signals.

Preferably said articulated arm system will comprise a base adapted to rotate around a first axis forming a first joint of said joints, a boom pivoted to said base on second joint having an axis of rotation in a plane substantially perpendicular to said first axis and a stick movably mounted on the free end of said boom for movement at a third joint, said end point being positioned adjacent the end of said stick remote from said boom.

Preferably means will be provided to compare the desired joint position at each said joint with its limits of displacement and will include means to modify the signal to prevent displacement at any one of said joints beyond its limits of its displacement.

BRIEF DESCRIPTION OF THE DRAWINGS

Further features, objects and advantages will be evident from the following detailed description of the preferred embodiment of the present invention taken into conjunction with the accompanying drawings in which.

DESCRIPTION OF THE PREFERRED EMBODIMENTS

Figure 1:
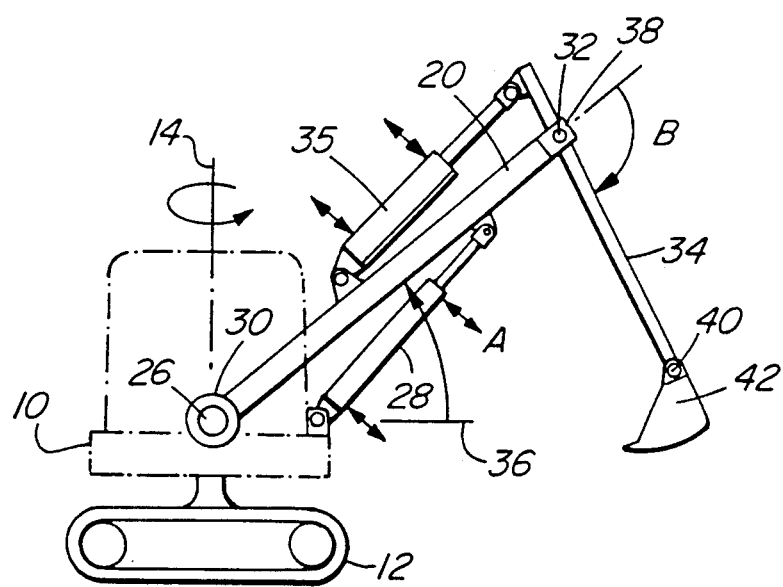
FIG. 1 is a schematic side illustration of an articulated arm vehicle in which the present invention may be incorporated.
Figure 2:
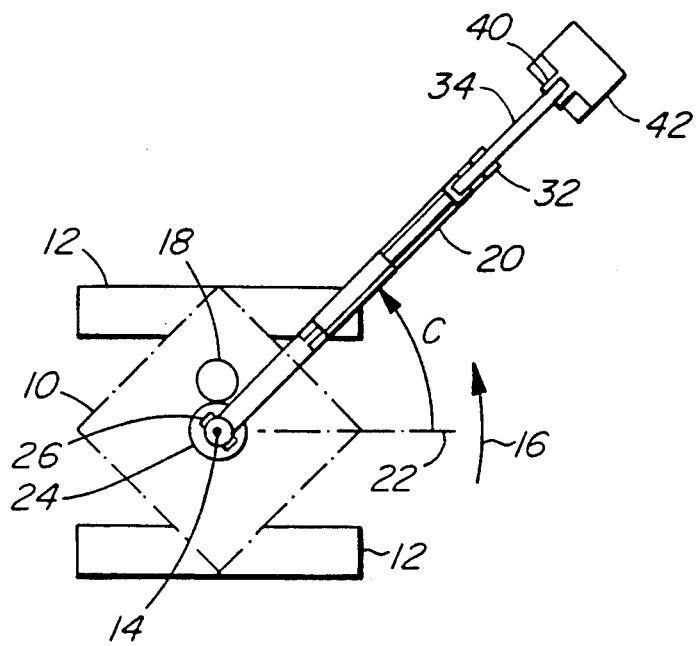
FIG. 2 is a schematic plan view of the vehicle of FIG. 1.

The particular vehicle to which the present invention may be applied is not restricted to the vehicle as shown schematically in FIGS. 1 and 2 but may be applied to other vehicles for similar or different purposes but wherein actuators are used to implement coordinated movement control of an articulated arm.

The equipment illustrated in FIG. 1 is a typical excavator system wherein a base 10 is mounted on a suitable propelling device such as tracks 12 and is rotatable about a substantially vertical axis 14 as indicated by the arrow 16. The base for purposes of this description is considered to be an arm segment of the articulated arm.

A suitable actuating means such as the hydraulic motor 18 rotates the base 10 on the axis 14. The angular joint position of the base in particular the angular orientation of the boom 20 to a selected plane 22 which, in the illustrated arrangement is substantially parallel to the tracks 12, is measured by a suitable sensor 24 to provide angle C.

The boom 20 is mounted on the base 10 for a pivotal movement around an axis 26 substantially perpendicular to the axis 14, i.e. horizontal.

Movement around the axis 26 is accomplished via a hydraulic actuator 28 which in this case is a double acting piston and cylinder. A suitable sensor or measuring device 30 measures the angle A between the boom 20 as defined by the line interconnecting the axis 26 connecting the boom to the base and the axis 32 connecting the stick to the free end of the boom, i.e. the axis of the shaft on which the stick 34 is pivoted to the boom.

The measuring device 30 measures the angle A between the boom 20 and a datum plane 36 which in the illustrated arrangement is substantially perpendicular to the axis 14 and passes through the axis 26, i.e. is substantially parallel to the surface of the base 10.

The angle B between the boom 20 and axis of the stick 34 is measured by a sensor 38. The stick 34 is moved relative to the boom 20 by a suitable double acting piston and cylinder 35.

While the sensor or measuring devices 30 and 38 have been illustrated as positioned at the joints being measured, any suitable system for determining these angles may be used eg. a sensor sensing the displacement of an actuator or a camera recording the location of the arm segments, etc.

At the free end of the stick 34 is the pivotal axis 40 on which the bucket 42 is connected to mount the bucket on the stick 34 (it will be apparent that the bucket 42 may be replaced with other suitable equipment). The axis 40 also has been designated as the end point of the articulated arm for the purposes of this description.

Figure 3:
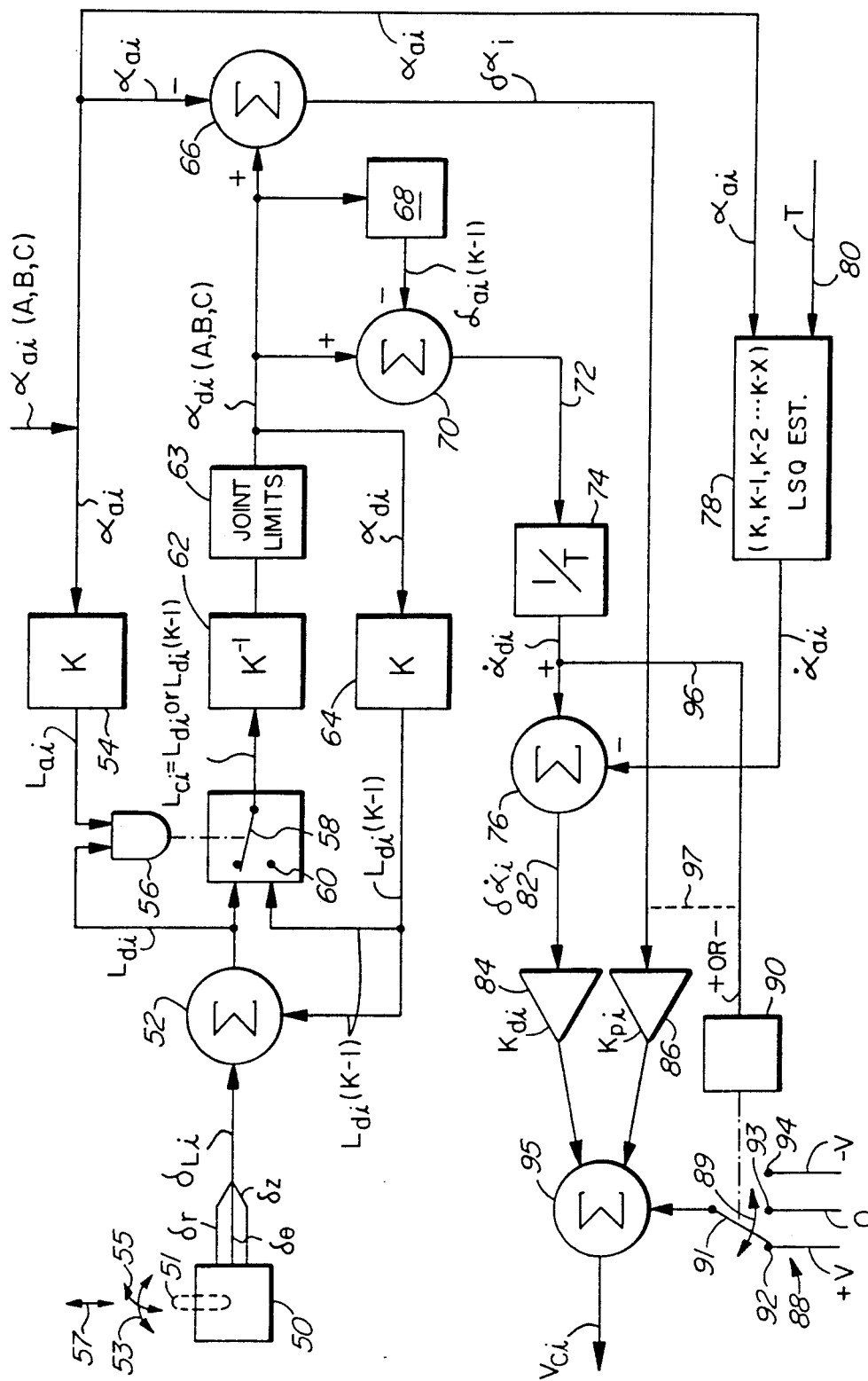
FIG. 3 is a schematic of a control system incorporating the present invention.

The control system will now be described with reference to FIG. 3. As illustrated input of commands requiring a change in end point location of an end point 40 is preferably accomplished via a control system 50, e.g. computer or joystick (51), that generates $\delta r$, $\delta\Theta$ and $\delta z$ commands. If a joystick is used, mutually perpendicular directions of movement, i.e. forward, sideways and axial directions as indicated by the arrows 53, 55 and 57 may generate corresponding forward and backward, sideways and up and down movements of the point 40.

$\delta r$, $\delta\Theta$ or $\delta z$ end point location command signals are provided to obtain r, $\Theta$ or z directions of movement and the amount of such movement in the respective r, $\Theta$ and z directions of the end point. Preferably the r, $\Theta$ and z directions of movement of the end point 40 and joystick will be the same relative to the operator's perspective when a joystick is used. In the cylindrical coordinate system as preferred the operator will be positioned on or adjacent to the z axis so that his perspective rotates around the z axis so that the r direction always remains in front of him. Thus manipulation of the joystick 51 develops $\delta r$, $\delta\Theta$ and $\delta z$ control signals depending on the direction of displacement and degree of displacement of the joystick.

To simplify the description-rather than showing all of these r, $\Theta$ and z signals as individual signal lines describing end point location a single line designated L with appropriate annotation have been used so that, for example, the combined signal from the control 50 has been indicated as $\delta L_i$ for the change in end point location. Similarly the joint position signals, e.g. defining the joint position of the arm segments e.g. the angles A and B, or the extension of the stick in equipment where the stick may be lengthened, etc. are treated essentially the same by the use of the symbol $\alpha_i$.

The $\delta L$ signal is delivered to a summer device 52 that adds the change in end point location demanded, (i.e. $\delta L_i$) to the previous desired end point location $L_{d(K-1)}$ (derived as will be described below) to produce an $L_{di}$ signal indicating the new desired end point location for the point 40.

At the same time the sensors 24, 30 and 38 are sensing the actual angles C, A and B respectively and this combined signal indicated as $\alpha_{ai}$ is fed to a direct kinematics computer calculating system 54 to calculate the actual r, $\Theta$ and z coordinates and provide a signal $L_{ai}$ indicating the actual end point location of the end point 40. These actual coordinates are then compared with the desired coordinates as provided by the signal $L_{di}$ in the comparator 56.

If the difference between the new desired end point location $L_{di}$ and the actual end point location $L_{ai}$ is too great as determined for any of the components r, $\Theta$ or z the switch 58 is moved from the position shown to contact 60 and the previous desired end point location signal $L_{di(K-1)}$ is retransmitted. In a more sophisticated version the switch 58 could be replaced by a signal generator that modifies the signal $L_{di}$ to produce a new desired end point location signal that takes into account the differences found in 56, however it is simpler to operate as shown. The new end point location signal $L_{ci}$ ($L_{di}$ or $L_{di(K-1)}$ in the illustrated arrangement) is then fed to the inverse kinematics converter 62.

This adjustment of the command signal $L_{ci}$ is particularly important for the boom 20 which is very heavy and tends to lag and this lag must be accommodated or the control system will not operate properly to control the arm.

The preset values for the differences between $L_{ai}$ and $L_{di}$ to trigger the switch 58 to the terminal 60 must be found empirically for each arm with which the system is used. If the preset values are set too low the arm simply will not move or will move too slowly, if set too high the arm will not move along the desired path.

Inverse kinematics as indicated at 62 provides a signal to the joint limit controller 63 that checks the commands to determine if any of the joint positions commanded exceed the limits of movement of any joint, if not the received signal is passed on, if so the signal is modified to prevent any of the joints from being commanded to exceed its limits. The signal transmitted by the joint limit controller 63 is indicated by the symbol $\alpha_{di}$. The new desired joint position of the arm segment is indicative of the direction and change of angles A, B and C.

The preferred manner of operation of the controller 63 when the stick motion is restricted by its joint limit in the articulated equipment shown in FIG. 1 is to set its desired angle $\alpha_{dB}$ to its joint limit and to modify the desired boom angle $\alpha_{dA}$ as follows:

$$\Theta_1 = \tan^{-1}(L_{cz}/L_{cr})$$

$$\alpha_{dA} = \alpha_{dA(K-1)} + \tan^{-1}\{(\delta z \cos \Theta_1 - \delta r \sin \Theta_1)/\sqrt{(L^2_{cz} + L^2_{cr})}\}$$

When the boom motion is restricted by its joint limit, preferably its desired angle $\alpha_{dA}$ is set to its joint limit and the desired stick angle $\alpha_{dB}$ is modified as follows:

$$\Theta_2 = \alpha_{dA} + \alpha_{dB}$$

$$\alpha_{dB} = \alpha_{dB(K-1)} + \tan^{-1}\{(\delta z \cos \Theta_2 - \delta r \sin \Theta_2)/\text{stick-length}\}$$

where stick-length = the distance between the axis 32 and the end point 40.

The above defined system results in a motion that is the vector component of the originally desired motion. The vector component lies along an instantaneous tangent to the arc formed by the endpoint motion when the unrestricted joint is allowed to move. Other schemes such as freezing the restricted joint and allowing the unrestricted joint to move by the amount output by the inverse kinematic calculator 62 may also be used if desired but the above defined system is preferred.

As indicated above, equivalent equations may be derived for use when a coordinate system other than a cylindrical system is chosen.

The signal $\alpha_{di}$ from the joint limit controller 63 is converted into the desired end point location signal by direct kinematics converter 64 which provides the signal $L_{di(K-1)}$ (the previous desired end point location signal) to which the $\delta L_i$ signal was added by the summer 52.

The signal $\alpha_{di}$ is compared with the actual joint position $\alpha_{ai}$ in the element (subtracter) 66 to provide a signal $\delta \alpha_i$ indicating the change required and whether the change is positive or negative.

The signal $\alpha_{di}$ is also fed to a memory system 68 so that the signal $\alpha_{di(K-1)}$ for the previous $\alpha_{di}$ is available for comparison with the new or the then current $\alpha_{di}$ signal in the element 70 to determine whether the changes to be made are positive or negative and the magnitude of these changes. The resultant signal is fed as indicated by line 72 in the converter 74 wherein it is divided by the sampling time to provide a velocity signal $\dot{\alpha}_{di}$ that is fed to an element 76 in which it has subtracted from it the estimated actual velocity $\dot{\alpha}_{ai}$ as determined by the computer 78 which assimilates a plurality of $\alpha_{ai}$ signals, i.e. actual joint positions signals sampled at a time period as indicated by the line 80 to produce an estimated actual velocity $\dot{\alpha}_{ai}$.

Thus the element 76 subtracts the actual estimated velocity $\dot{\alpha}_{ai}$ from the desired velocity $\dot{\alpha}_{di}$ to generate a signal in line 82. The signal from line 82 $\delta \dot{\alpha}_i$ is fed to a multiplier 84 (gain) wherein it is amplified by a constant value. The value $K_{di}$ is determined empirically in conjunction with the value of the constant $K_{pi}$ for the multiplier 86 (gain) which is applied to the signal $\delta \alpha_i$ by an iterative process of sequentially increasing the values for $K_{pi}$ and $K_{di}$ until $K_{pi}$ is the maximum for stable operation of the control system.

It will be apparent that the values for $K_{di}$, $K_{pi}$ will be different for each of the actuators. The constants for each actuator are determined empirically to maximize the gain applied in each of the units 84 and 86. When the gain is too high the unit becomes unstable or too low the device reacts too slowly.

Also contributing to the final signal to the pilot valves, is a biasing system 88 which is controlled by a controller 90 regulating a switch 91 between contacts 92, 93 and 94 as indicated by the arrow 89. A contact 92 connects switch 91 to a positive voltage, 93 to zero voltage and 94 to a negative voltage which is applied to the summer 95 to be added to the signals from the multiplier devices 84 and 86 to produce the voltage signal $V_{ci}$ to control the pilot valve for each operation.

The controller 90 is controlled by sensing the polarity of the signal $\dot{\alpha}_{di}$ via line 96 or as indicated by the line 97 of signal $\delta \alpha_i$ to indicate whether the signal is positive or negative, i.e. a positive voltage (92) or negative voltage (94) demanded or if there is no signal at all and no voltage (93) is demanded.

The positive and negative biasing voltage applied by the contacts 92 and 94 is sufficient to apply pressure to the pilot valve just below the margin of the dead band region so that the components of the voltage generated by devices 84 and 86 control the pilot valve to move the main valve spool into its active area.

Figure 4:
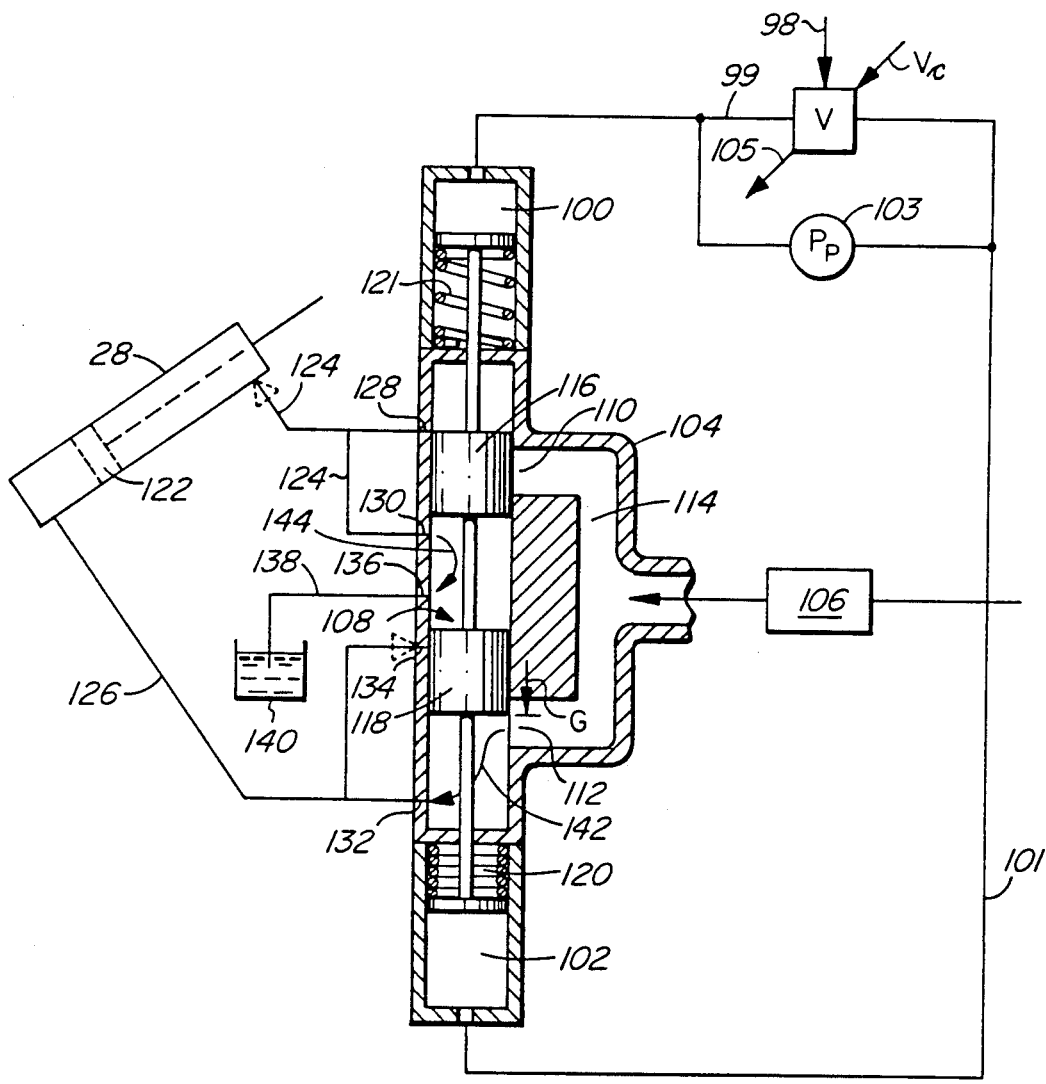
FIG. 4 is a schematic illustration of one type of control valve for controlling the operating of a hydraulic actuator based on the input signals from the present invention.

FIG. 4 schematically illustrates one form of control system that may be utilized with the present invention. In the system as illustrated the signal $V_{ci}$ is used to operate a pilot valve V which applies pressure, preferably hydraulic pressure from a source as indicated by the arrow 98 via line 99 or 101 to the drive cylinders 100 or 102 respectively of a main valve 104 or to vent the line 105. The pressure difference in the lines 99 or 101, i.e. the pilot pressure $P_p$ is measured via the device indicated at 103.

The main valve 104 is connected to a source of hydraulic fluid under pressure, for example from a pump or pressure reservoir 106. It is the function of the valve 104 to direct the hydraulic fluid to the actuator such as the actuator 28 shown in FIG. 4 which may take the form of a piston and cylinder arrangement such as the actuators 28 and 35 or a hydraulic motor as indicated by the actuator 18 for rotation around the axis 14 (see FIGS. 1 and 2). In any event the spool 108 in the valve 104 is moved in opposite directions by applying fluid pressure to the cylinders 100 or 102 which moves the spool 108 to open and close ports 110 and 112 leading from a manifold 114. In the illustrated arrangement the spool 108 has an upper cylindrical spool section 116 and a lower cylindrical spool section 118. These sections are interconnected and moved simultaneously by the pressure applied to the cylinder 100 or 102 each of which operates against a restoring force tending to move the spool 108 in the opposite direction, i.e. in the illustration the restoring force is applied by a spring or the like 120 and 121 respectively. It is the pressure in the cylinders 100 or 102 that determines the joint position of the spool 108 within the valve 104 and this pressure (pilot pressure $P_p$ measured by device 103) is directly dependent upon the degree of opening of the pilot valve V which is controlled by the signal $V_{cA}$ used to adjust the angle being changed by the drive being actuated. Obviously similar signals $V_{cB}$ and $V_{cC}$ will be provided for their respective actuators.

In the system illustrated the hydraulic actuator 28 is a double acting actuator and is hydraulically connected at opposite ends, i.e. on opposite sides of the piston 122 by lines 124 and 126. The line 124 is connected to ports 128 and 130 in the valve 104 while the line 126 is connected to the ports 132 and 134 respectively. An exhaust port 136 connects to a line 138 which delivers fluid to a reservoir 140.

In the joint position illustrated the signal $V_{cA}$ to the valve V has applied a selected amount of pressure to the cylinder 102 and connected the cylinder 100 to vent line 105 so that the port 110 is disconnected and the port 112 is partially open as indicated by the dimension G so that fluid under high pressure from the pump or reservoir 106 flows from the manifold 114 through the passage 112 as indicated by the arrow 142, out through port 132 and line 126 into the actuator 28 beneath the piston 122. The hydraulic fluid is forced out of the actuator 28 from above the piston 122 via line 124 port 130 and as indicated by the arrow 144 out through port 136 and line 138 to reservoir 140. The ports 128 and 134 are sealed by the cylinders 116 and 118.

It will be apparent that if the actuator 28 is to be moved in the opposite direction the port 110 will open and connect with the port 128 while the port 112 will be closed by applying the required amount of pressure to the cylinder 100 to overcome the pressure of spring 120 and compress the spring 120 to the required degree (line 101 is connected to the vent 105.) Similarly the port 130 will be closed and the port 134 will be connected to the port 136 to permit exhausting from the opposite side of the piston 122.

The above description has been directed toward a closed centre valve, but it will be apparent that the system could equally well be applied to an open centre valve (i.e. a valve wherein the fluid flows directed to the receiving reservoir when not directed to move the actuator.)

The control system could also, with suitable modification be used to control a variable displacement pump operating the cylinder 28.

Figure 5:
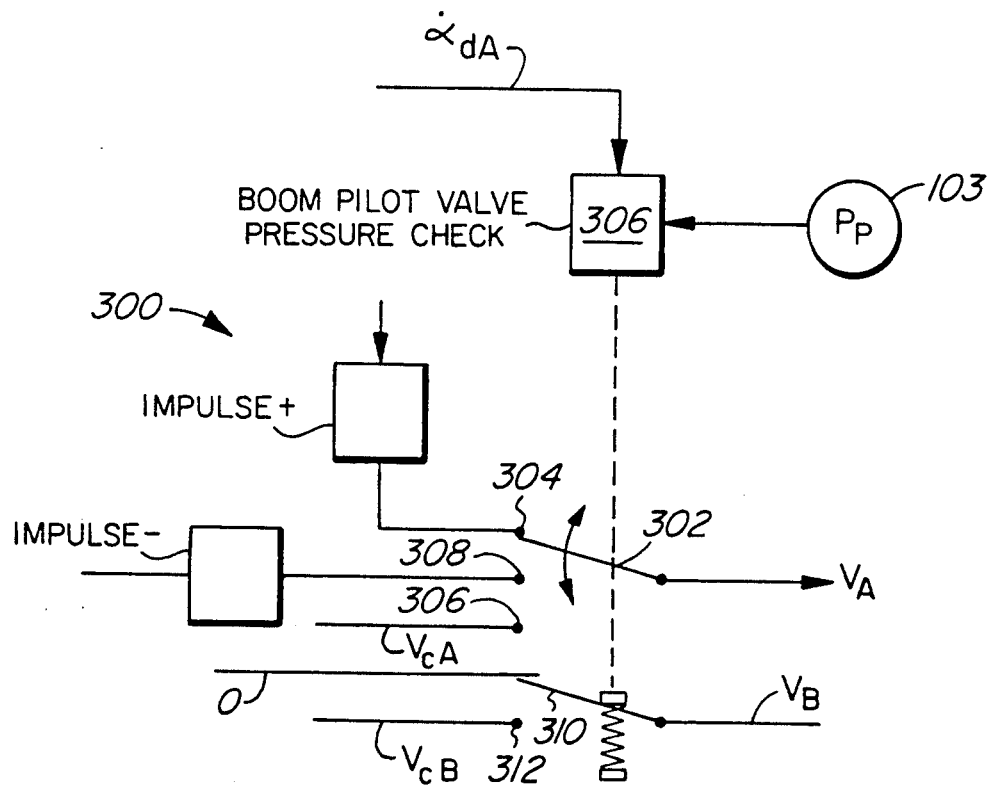
FIG. 5 is a schematic circuit diagram for initiating operation of a heavy arm segment (the boom).

As indicated it is sometimes desirable to apply a voltage impulse to the control valve or pilot valve signal to ensure proper actuation particularly from a stopped position. This is even more important when one is attempting to move the heavy boom (joint A). Under these conditions the command for pilot valve for joint A ($V_{cA}$) may be replaced by a voltage impulse command as indicated at 300 (see FIG. 5) by swinging the switch 302 into contact with the contact 304 or 308 to provide a modified signal $V_{cA}$.

This switch 302 is manipulated by a controller 306 that checks the boom pilot valve pressure sensed by the pressure sensor 103. If the pressure is too low then the switch 302 is connected to the contact 304 or 308 and applies a high positive or negative impulse voltage to operate the valve for angle A depending on whether the signal $\dot{\alpha}_{dA}$ is + or −. If the pilot pressure $P_p$ is high enough the switch 302 remains on contact 306 and signal $V_{cA}$ is provided to operate the valve for angle A. The $\dot{\alpha}_{dA}$ signal is fed to the controller 306 to define whether a + or − impulse voltage is required or if no signal $\dot{\alpha}_{dA}$ is given to do nothing.

Depending on the speed of the pilot valves, it may also be desirable to make the stick wait for the boom. When the pulse from contacts 304 or 308 is applied to $V_A$ as schematically represented, the switch 310 disconnects the signal line $V_B$ from the terminal 312 and a zero signal to adjust the stick is sent until the switch 302 returns to contact 306 at which time the switch 310 is in contact with the contact 312.

Figure 6:
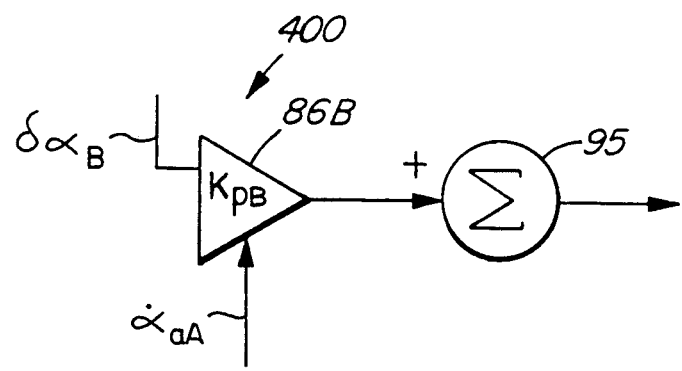
FIG. 6 is a schematic illustration of a system for influencing another arm segment (the stick) actuator depending on movement of a heavy arm segment (boom).

In some cases depending on the actual velocity of the boom angle A as indicated by line $\dot{\alpha}_{aA}$ a supplement control 400 (see FIG. 6) may be activated to modify the signal $V_B$, i.e. the degree of adjustment of angle B to accommodate the excessive demand of hydraulic fluid by the larger cylinder used to adjust angle A. This control modifies the factor $K_{pB}$ dependent on $\dot{\alpha}_{aA}$ to send a signal to the summer 95, which increases the gain with higher $\dot{\alpha}_{aA}$ signals.

Having described the invention modifications will be evident to those skilled in the art without departing from the spirit of the invention as defined in the appended claims.

We claim:

1. A motion control system for actuators adapted to move arm segments of an articulated arm, said arm segments being interconnected by joints comprising a control means generating δr, δΘ and δz signals for r, Θ and z directional movements of an end point at the free end of an arm segment, actuator means for displacing each said arm segment relative to one of said joints, means to actuate each of said actuators as required to obtain a desired movement of said end point as directed by said r, Θ, and z signals, means to measure the actual joint position of each of said joints, means to determine the desired joint position of each of said joints, means to determine the actual end point location of said end point, means to calculate a new desired end point location based on said δr, δΘ and δz signals and the previous desired end point location of said end point, means to compare said determined actual end point location with said calculated new desired end point location, means to send modified r, Θ and z signals to adjust the joint position of said joints if said actual end point location differs from said new desired end point location by more than a preset limit and means to generate control signals to control the operation of said actuating means to obtain the desired movement of said end point based on said modified r, Θ and z signals to reduce the discrepancy between said actual end point location and said new desired end point location.

2. A motion control system as defined in claim 1 wherein said means to generate said control signal includes means for converting said new desired end point location signal to a joint position signal for each of said joints and means to compare said joint position signal for each of said joints with an actual joint position for each of said joints thereby provide a change in joint position signal for each of said joints.

3. A motion control as defined in claim 2 wherein said means to generate said control signal further comprise means to compare said joint position signals for each of said joints with the immediately preceding joint position signal for each of said joints and dividing by time to provide a velocity signal for controlling the actuation of each of said joints.

4. A motion control system as defined in claim 3 wherein said means to calculate a new desired end point location includes means to calculate said previous new desired end point location based on the immediately preceding desired joint positions.

5. A motion control system as defined in claim 4 further comprising means to sense whether the desired movement is in a positive or negative direction or if no movement is required and wherein said control means is adapted to provide a corresponding positive, negative or zero bias signal to said control signals.

6. A motion control system as defined in claim 1 wherein said arm segments comprise a base adapted to rotate around a substantially vertical axis forming a first joint of said joints, a boom pivoted to said base on a second joint having a substantially horizontal axis of rotation and a stick movably mounted on the free end of said boom for movement at a third joint, said end point being joint positioned adjacent to the end of said stick remote from said boom.

7. A motion control system as defined in claim 1 further comprising a joint limit controller to compare desired joint position for each said joint with limits of displacement of each respective said joint positions and to modify said control signals to selected actuators to stop displacement at any one of said joints when said one joint reaches the limit of its displacement.

8. A motion control system as defined in claim 7 wherein said joint limit controller modifies said control signals to require said end point to move along a tangent to an arc formed by end point motion when the unrestricted joint is allowed to move.

9. A motion control system as defined in claim 2 further comprising a joint limit controller to compare desired joint position for each said joint with limits of displacement of each respective said joint positions and to modify said control signals to selected actuators to stop displacement at any one of said joints when said one joint reaches the limit of its displacement.

10. A motion control system as defined in claim 9 wherein said joint limit controller modifies said control signals to require said end point to move along a tangent to an arc formed by end point motion when the unrestricted joint is allowed to move.

11. A motion control system as defined in claim 3 further comprising a joint limit controller to compare desired joint position for each said joint with limits of displacement of each respective said joint positions and to modify said control signals to selected actuators to stop displacement at any one of said joints when said one joint reaches the limit of its displacement.

12. A motion control system as defined in claim 11 wherein said joint limit controller modifies said control signals to require said end point to move along a tangent to an arc formed by end point motion when the unrestricted joint is allowed to move.

13. A motion control system as defined in claim 4 further comprising a joint limit controller to compare desired joint position for each said joint with limits of displacement of each respective said joint positions and to modify said control signals to selected actuators to stop displacement at any one of said joints when said one joint reaches the limit of its displacement.

14. A motion control system as defined in claim 13 wherein said joint limit controller modifies said control signals to require said end point to move along a tangent to an arc formed by end point motion when the unrestricted joint is allowed to move.

15. A motion control system as defined in claim 5 further comprising a joint limit controller to compare desired joint position for each said joint with limits of displacement of each respective said joint positions and to modify said control signals to selected actuators to stop displacement at any one of said joints when said one joint reaches the limit of its displacement.

16. A motion control system as defined in claim 15 wherein said joint limit controller modifies said control signals to require said end point to move along a tangent to an arc formed by end point motion when the unrestricted joint is allowed to move.

17. A motion control system as defined in claim 6 further comprising a joint limit controller to compare desired joint position for each said joint with limits of displacement of each respective said joint positions and to modify said control signals to selected actuators to stop displacement at any one of said joints when said one joint reaches the limit of its displacement.

18. A motion control system as defined in claim 17 wherein said joint limit controller modifies said control signals to require said end point to move along a tangent to an arc formed by end point motion when the unrestricted joint is allowed to move.

* * * * *